United States Patent
Fildebrandt et al.

(10) Patent No.: US 7,774,745 B2
(45) Date of Patent: Aug. 10, 2010

(54) MAPPING OF DESIGNTIME TO RUNTIME IN A VISUAL MODELING LANGUAGE ENVIRONMENT

(75) Inventors: Ulf Fildebrandt, Oftersheim (DE); Frank E. Seeger, Wiesloch (DE); Yuval Gilboa, Pardesiya (IL)

(73) Assignee: SAP AG, Walldorf (DE)

( * ) Notice: Subject to any disclaimer, the term of this patent is extended or adjusted under 35 U.S.C. 154(b) by 1142 days.

(21) Appl. No.: 11/323,391

(22) Filed: Dec. 29, 2005

(65) Prior Publication Data

US 2007/0168384 A1      Jul. 19, 2007

(51) Int. Cl.
G06F 9/44       (2006.01)

(52) U.S. Cl. .................................... 717/105; 717/104

(58) Field of Classification Search .......... 717/104–107
See application file for complete search history.

(56) References Cited

U.S. PATENT DOCUMENTS

| | | | |
|---|---|---|---|
| 5,446,846 | A | 8/1995 | Lennartsson |
| 6,049,822 | A | 4/2000 | Mittal |
| 6,230,309 | B1 * | 5/2001 | Turner et al. ................. 717/107 |
| 6,247,174 | B1 | 6/2001 | Santhanam et al. |
| 6,407,761 | B1 | 6/2002 | Ching et al. |
| 6,429,880 | B2 | 8/2002 | Marcos et al. |
| 6,476,828 | B1 | 11/2002 | Burkett et al. |
| 6,898,794 | B2 | 5/2005 | Babutzka et al. |
| 7,043,693 | B2 | 5/2006 | Wenzel et al. |
| 7,127,328 | B2 | 10/2006 | Ransom |
| 7,412,658 | B2 | 8/2008 | Gilboa |
| 7,463,263 | B2 | 12/2008 | Gilboa |
| 2001/0045963 | A1 | 11/2001 | Marcos et al. |
| 2002/0104068 | A1 | 8/2002 | Barrett et al. |
| 2003/0202014 | A1 | 10/2003 | Wood |
| 2004/0148586 | A1 * | 7/2004 | Gilboa ........................ 717/108 |
| 2005/0203951 | A1 | 9/2005 | Schroeder et al. |
| 2005/0257157 | A1 | 11/2005 | Gilboa et al. |
| 2005/0261884 | A1 | 11/2005 | Sakamoto et al. |
| 2006/0004845 | A1 * | 1/2006 | Kristiansen et al. ..... 707/103 R |
| 2006/0036479 | A1 * | 2/2006 | Whitmore ................... 705/10 |

(Continued)

FOREIGN PATENT DOCUMENTS

WO      01/77822 A2    10/2001

OTHER PUBLICATIONS

U.S. Appl. No. 12/613,250, filed Nov. 5, 2009, Gilboa.

(Continued)

*Primary Examiner*—Anna Deng
(74) *Attorney, Agent, or Firm*—Fountainhead Law Group PC (57) ABSTRACT

Methods and apparatus, including computer program products, for generating runtime entities in a visual modeling environment. A method includes providing designtime graphical modeling language entities for use in a visual modeling program, receiving input defining an application definition at designtime as including at least a first and second designtime entities as components of a designtime version of the application, and generating runtime entities of the application. The designtime graphical modeling language entities include the first and second designtime entities, and the first designtime entity has an associated first runtime entity precompiled for a first platform. The input includes a configuration of properties of the first and second designtime entities, and generating the runtime entities includes setting properties of the first runtime entity in accordance with the configuration of properties of the first designtime entity.

20 Claims, 7 Drawing Sheets

U.S. PATENT DOCUMENTS

| | | | |
|---|---|---|---|
| 2006/0047789 A1 | 3/2006 | Kumar et al. | |
| 2006/0064667 A1 | 3/2006 | Freitas | |
| 2006/0168278 A1 | 7/2006 | Lazen et al. | |
| 2006/0206864 A1 | 9/2006 | Shenfield et al. | |
| 2006/0206890 A1* | 9/2006 | Shenfield et al. | 717/174 |
| 2007/0022394 A1 | 1/2007 | Ghosh et al. | |
| 2007/0038609 A1 | 2/2007 | Wu | |
| 2007/0094609 A1* | 4/2007 | Gilboa et al. | 715/762 |
| 2007/0157159 A1 | 7/2007 | Fildebrandt et al. | |
| 2007/0168383 A1 | 7/2007 | Fildebrandt et al. | |
| 2007/0168384 A1 | 7/2007 | Fildebrandt et al. | |
| 2007/0213972 A1 | 9/2007 | Schejter et al. | |
| 2007/0239717 A1* | 10/2007 | Thrash et al. | 707/7 |
| 2009/0006992 A1* | 1/2009 | Gilboa | 715/763 |
| 2009/0007062 A1 | 1/2009 | Gilboa | |
| 2009/0172695 A1 | 7/2009 | Lazaroff et al. | |

OTHER PUBLICATIONS

Abrams et al., "UIML: An Appliance-Independent XML User Interface Language". Computer Networks (1999). vol. 31, No. 11-16, pp. 1695-1708.

Ceri, Stefano et al., "Web Modeling Language (WebML): A Modeling Language for Designing Web Sites," Computer Networks (2000). vol. 33, pp. 137-157.

Callahan, Evan, "Microsoft Access 2000: Visual Basic Applications Fundamentals," Microsoft Press, 1999.

Microsoft Computer Dictionary, 5th Ed., Microsoft Press, 2002.

Ayers, Larry, "A Beginner's Guide to Compiling Source Code," http://www.linuxjournal.com/article/0216. 1996.

Verio—"Logging into your Server from FrontPage," http://www.verio.com/support/documents/view_article.cfm?docid=3703. 2006.

Fitzloff, Emily, Gardner, Dana, "Web Open Enterprise Portals," http://www.infoworld.com/cgi-bin/displayStory.pl?/features/990125eip.htm Jan. 25, 1999.

"ABAP," http://www.wikipedia.org/wiki/ABAP Apr. 2007.

"RFC," http://en.wikipedia.org/wiki/Remote_function_call Mar. 2007.

"XML," http://en.wikipedia.org/wiki/Xml Mar. 2007.

"Canonical," http:/dictionary.reference.com/browse/canonical 2000.

Nora Koch and Andreas Kraus, "The Expressive Power of UML-based Web Engineering," May 2002, Ludwig-Maximilians-University Munchen.

* cited by examiner

MAPPING OF DESIGNTIME TO RUNTIME IN A VISUAL MODELING LANGUAGE ENVIRONMENT

BACKGROUND

The present disclosure relates to data processing by a digital computer in a visual modeling language environment, and more particularly to mapping of designtime entities to runtime entities in a visual modeling language environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as Visual Composer, which is a visual modeling program manufactured by SAP AG of Walldorf (Baden), Germany (SAP). A tool like Visual Composer allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the Java programming language from Sun Microsystems, Inc. of Santa Clara, Calif.). A runtime version of an application can be generated by a visual modeling program based on a designtime version of the application, with the use of a model underlying the designtime version of the application. For example, a designtime version of an application can be used to devise a model with Java classes, and, the Java classes can be compiled to generate a Java runtime version of an application.

SUMMARY

The present disclosure provides methods and apparatus, including computer program products, that implement techniques for generating an application including a mapping of designtime entities to runtime entities, in a visual modeling language environment.

In one general aspect, the techniques feature a computer-implemented method of generating runtime entities in a visual modeling environment. That method includes providing designtime graphical modeling language entities, receiving input defining an application definition at designtime as including at least a first and second designtime entities as components of a designtime version of the application, and generating runtime entities of the application. The designtime graphical modeling language entities include the first and second designtime entities, and the first designtime entity has an associated first runtime entity precompiled for a first platform. The input includes a configuration of properties of the first and second designtime entities, and generating the runtime entities includes setting properties of the first runtime entity in accordance with the configuration of properties of the first designtime entity.

Implementations can include one or more of the following advantageous features. An architecture of a modeling environment of the visual modeling program can include a first layer defining a technical platform of the first platform, a second layer defining a framework for implementing a modeling language in the technical platform, a third layer defining designtime interfaces for the modeling language entities, and a fourth layer defining a layer for configuring modeling language entities, where the first designtime entity can be implemented in the second layer.

The visual modeling program can define a modeling language to include scenarios that represent a reusable interface unit of the application, interactors that transform input data into output data, and services that provide data.

The second designtime entity can have an associated second runtime entity precompiled for the first platform (e.g., a runtime environment, such as Java). The visual modeling program can define a modeling language to be independent of a platform. The first designtime entity can have an associated second runtime entity precompiled for a second platform.

In another aspect, a computer-implemented method includes receiving input defining an application definition at designtime (e.g., a designtime version of an application) as including at least a first designtime entity, determining whether the first designtime entity can be directly mapped to a runtime entity (e.g., as part of determining whether any of the designtime entities can be directly mapped), and directly mapping the first designtime entity to an associated runtime entity by setting properties of the first runtime entity in accordance with a configuration of properties of the first designtime entity. The designtime entity is directly mapped to the runtime entity as at least one of the properties of the designtime entity has a corresponding property in the runtime entity and the value of the property in the designtime entity is used to set the corresponding property of the runtime entity. For example, if a property "length" of a designtime entity had a value of "5," the property could be directly mapped to a corresponding property "length" of an associated runtime entity by setting the "length" property of the associated runtime entity to "5." In that method, the associated runtime entity can be precompiled for a computing-platform such that setting the property of the runtime entity can involve editing the runtime entity to include the property without further compiling the runtime entity. For example, a configuration area of a runtime entity can have a list of properties that can be set and a visual modeling program can understand those properties, determine which properties can be directly mapped from designtime properties (e.g., if properties have same or similar names), and directly map those properties by transposing the properties of an associated designtime entity to that runtime entity (e.g., without transposing the properties of the designtime entity to a model of the application).

In another aspect, a computer program product, tangibly embodied in an information carrier, is operable to cause data processing apparatus to perform operations similar to that of the methods above. In yet another aspect, a system includes designtime graphical modeling language entities for use in a visual modeling program, a software component for receiving input defining an application definition at designtime as including at least a first and second designtime entities as components of a designtime version of the application, and a software component for generating runtime entities of the application. The designtime graphical modeling language program includes the first and second designtime entities. The first designtime entity has an associated first runtime entity precompiled for a first platform. The input includes a configuration of properties of the first and second designtime entities. The component for generating runtime entities of the application includes a component for setting properties of the first runtime entity in accordance with the configuration of properties of the first designtime entity.

The subject matter disclosed in this specification can be implemented to realize one or more of the following advantages.

Designtime entities in a visual modeling language environment can have associated runtime entities. The runtime entities can be directly mapped from the designtime entities such that runtime entities can be easily generated. Advantageously, by having a direct mapping of designtime entities to runtime entities, a complexity of mapping algorithms in a visual language modeling environment can be reduced. For example, a designtime entity need not be mapped to a model version of an entity before being mapped to a runtime entity. As another example, special generators need not be used to generate a runtime entity, which can reduce an amount of generators that need to be coded for a visual modeling language environment and can reduce an amount of time required to generate runtime entities, as entities need not be generated through a special generator (e.g., runtime entities can be precompiled).

In addition, complexity can be reduced by mapping relatively simple to configure designtime entities to runtime entities being relatively difficult to configure (e.g., requiring experience or training to understand how a runtime entity should be configured to provide a desired behavior). Thus, details related to structural and behavior of a runtime entity can be considered an implicit part of a UI pattern represented by the entity, and simplified designtime views can be generated that are easy to understand and configure, yet produce non-trivial and useful applications.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
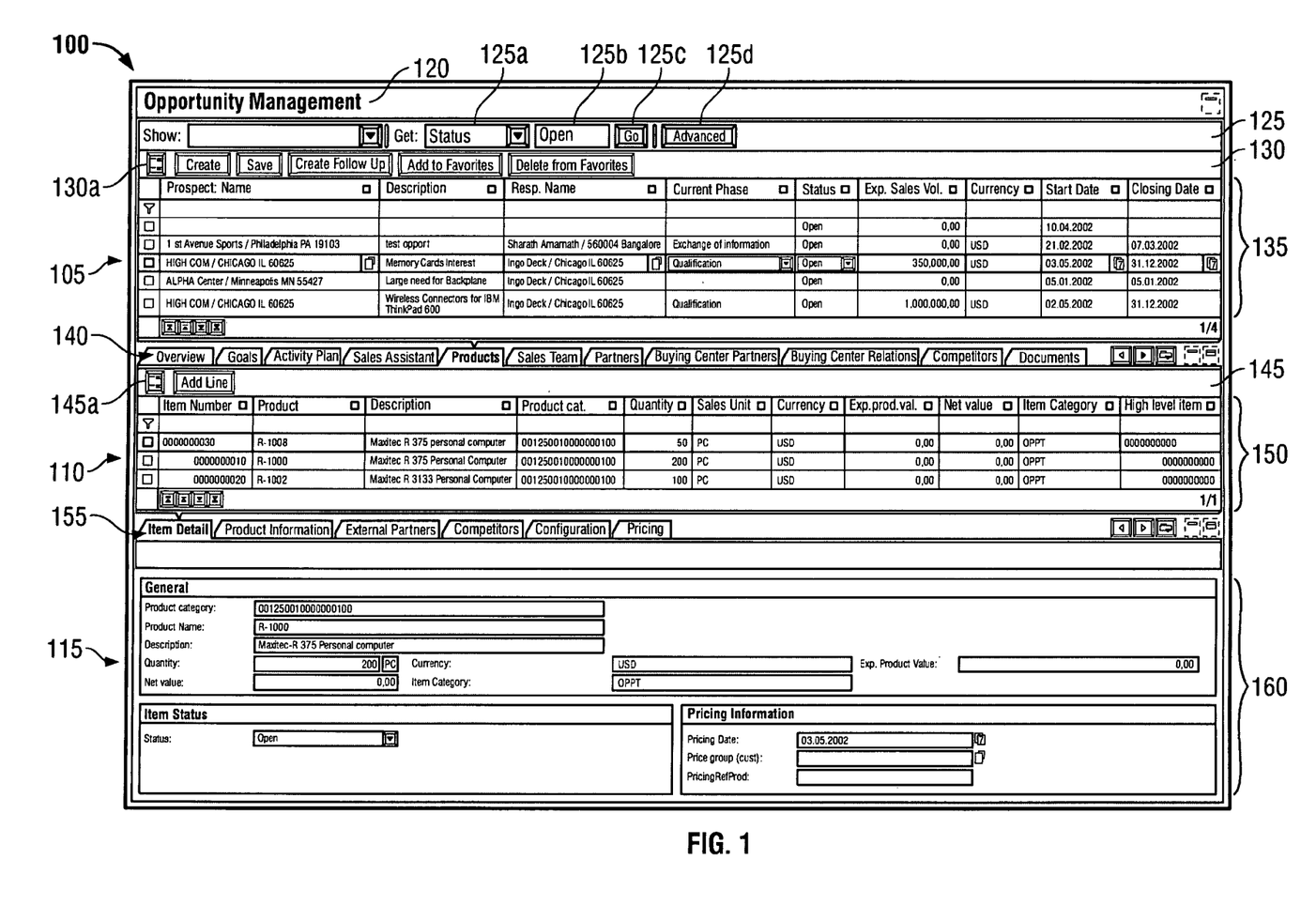
FIG. 1 is a screenshot of a user interface.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Figure 2:
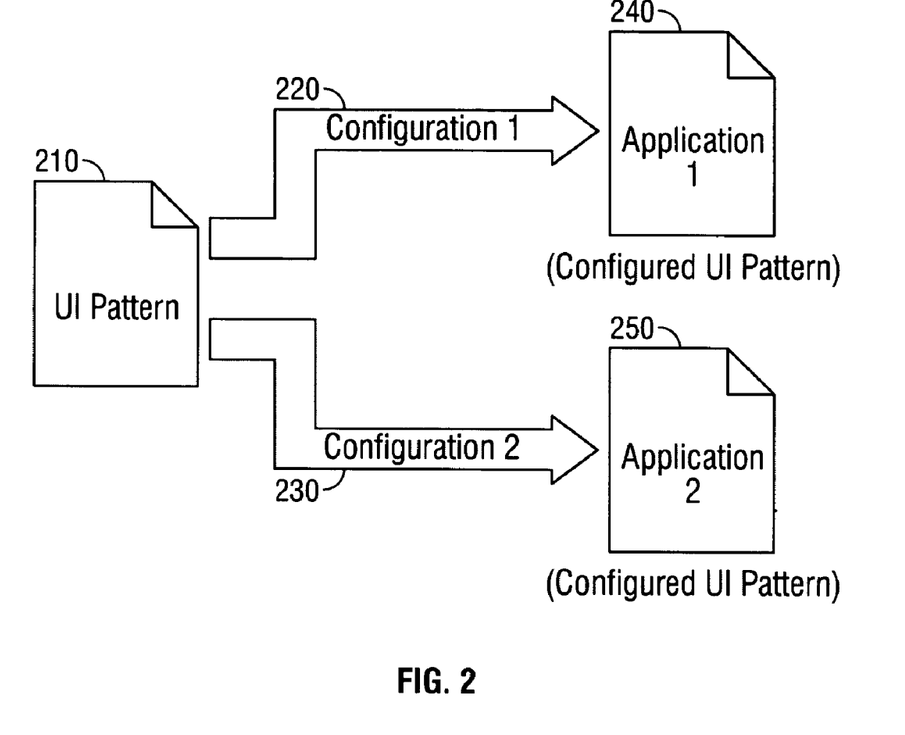
FIG. 2 is a block diagram illustrating the configuration of a UI pattern.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
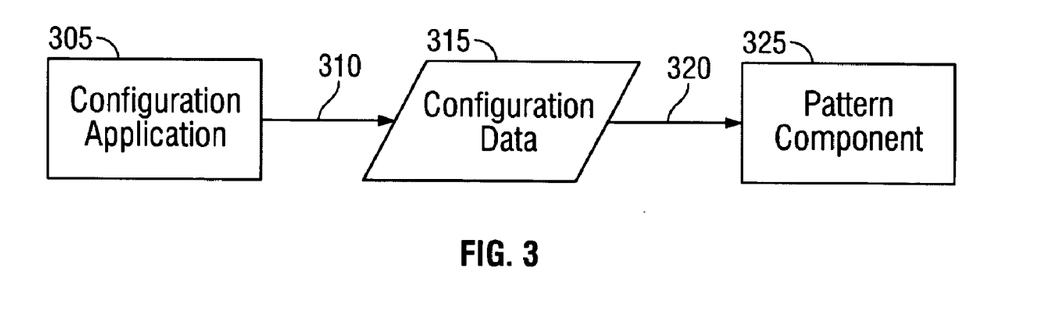
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
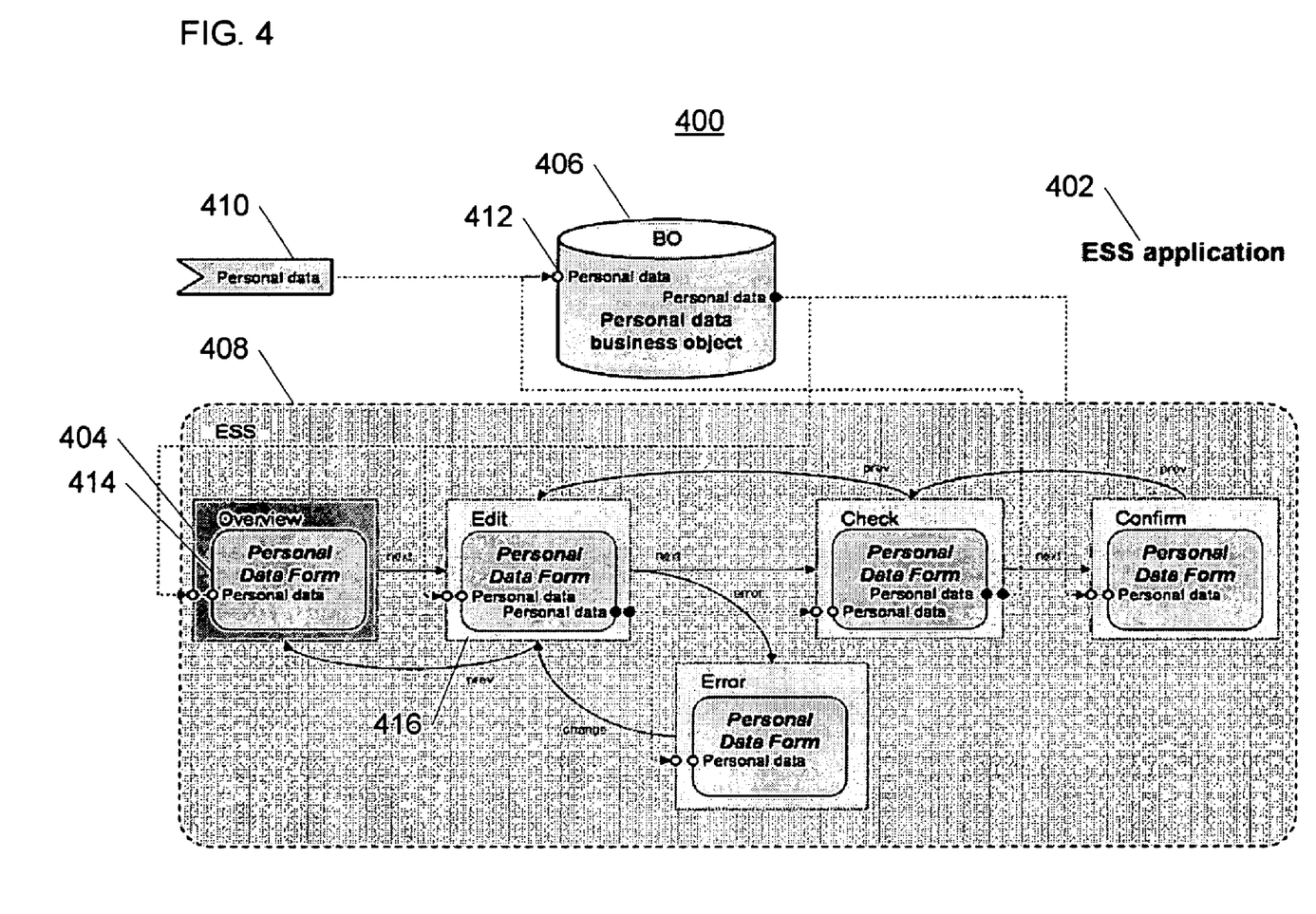
FIG. 4 is an illustration of an application being developed in a visual modeling program.

FIG. 4 is an illustration 400 of an application being developed in a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program by defining graphical representations used for designtime entities in a visual modeling program (e.g., how a pattern, such as an interactor, is represented to an application developer), rules that govern how the graphical representations can be composed and connected (e.g., exact rules for a language syntax for modeling language entities), and a specification that governs how a composition of modeling language entities will be interpreted to generate a runtime version of an application (e.g., an exact specification of semantic rules for how designtime entities should be represented in a runtime version of an application). Thus, the base set of patterns, which can describe how the patterns should be represented, syntax for the patterns, and semantics of those patterns, can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed) (e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed.

Figure 5:
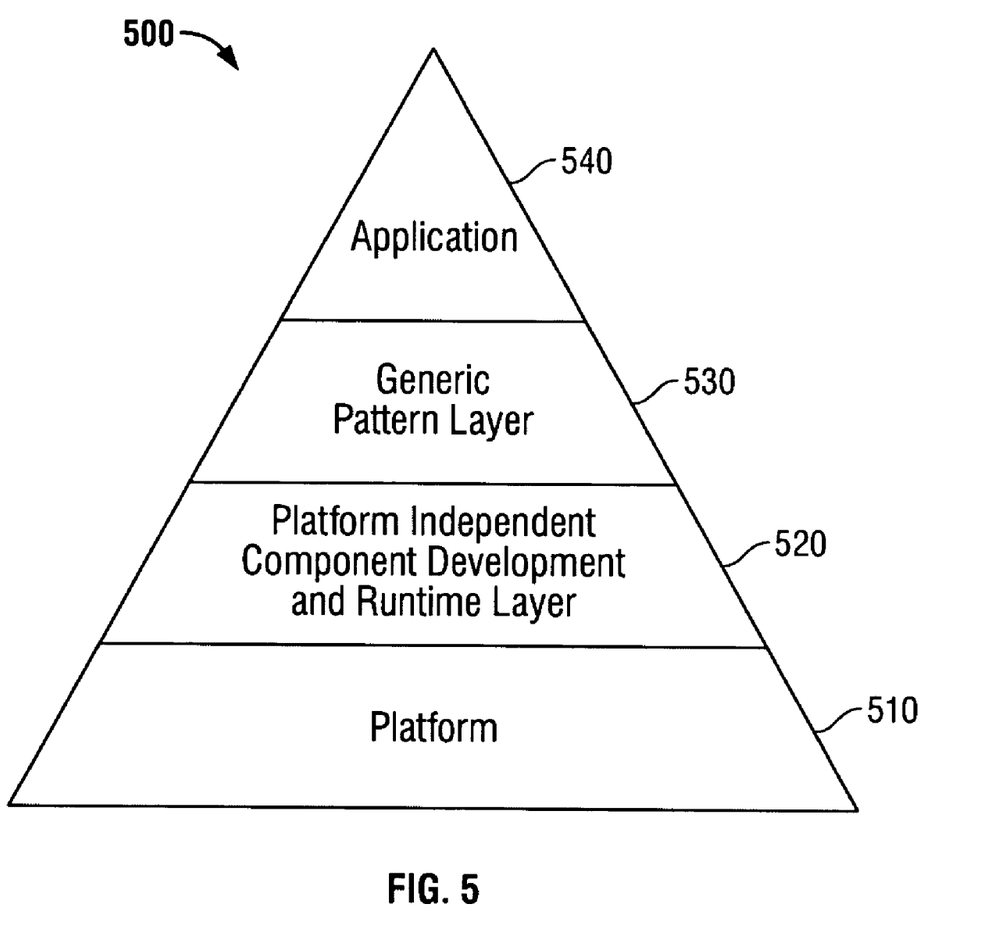
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems and the Advanced Business Application Programming (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Figure 6:
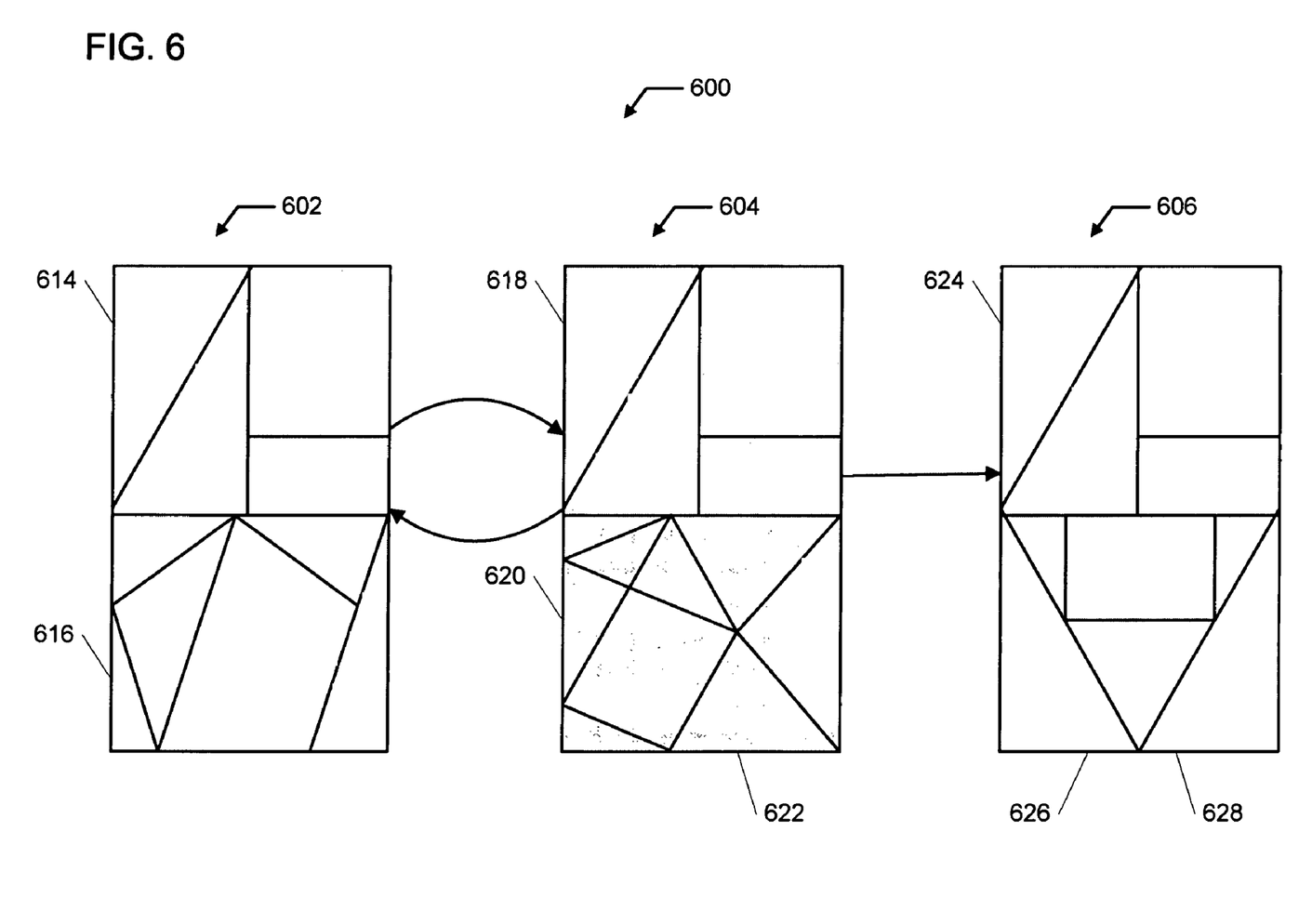
FIG. 6 is a diagram of different versions of an application in a visual modeling language environment.

FIG. 6 is a diagram 600 of different versions of an application in a visual modeling language environment. The diagram includes a runtime version 602 of an application, a version of the application as a model 604, and a designtime version 606 of the application. In general, a designtime version of an application represents the version of an application with which a user interacts to develop the application, whereas, a model can represent a platform independent expression of entities that correspond to the designtime version of the application. And, a runtime version of the application can be a version of the application which can be generated for a platform such that the application can execute on that platform (e.g., a platform-specific executable version of an application).

The diagram 600 represents how entities with a same or similar functionality can differ across different versions of an application. In the diagram 600, each of the versions of the application have a different breakdown of entities, as represented by the different shapes and sizes of shapes that make up each of the versions of the application. For example, the designtime version 602 has a small triangle 616 that represents an entity that is the same as the combination of entities that are represented by the triangles 620 and 622 in the model 604 of the application. Also, the combination of triangles 626, 628 of the runtime version 606 are differently shaped and sized from the combination of triangles 620, 622 of the model 604, although the combinations represent entities that, when combined, have the same functionality. For example, the small triangle 616 of the designtime version of the application can represent a search form (e.g., a designtime entity being a form for composing a search of a data source) of an application, and the combination of the entities represented by the triangles 620, 622 of the model 604 can represent a model version of the search form (e.g., a Java class for receiving a search request and a Java class for performing searches).

The diagram 600 can represent relationships involved in generating runtime entities of an application. For example, based on a selection in the designtime environment 602 of the entity represented by the small triangle 616, an associated one or more model entities, which represents the same or similar semantics and syntax, can be selected for use in the model 604 representation. For example, a user of a visual modeling program can select a search form designtime entity and the visual modeling program can select UML classes that represent the same or similar functionality as the search form. Based on the model entities, runtime entities can be generated. For example, based on the model entities represented by the triangles 620, 622 of the model 604, a visual modeling program can generate runtime entities, as represented by the triangles 626, 628 in the runtime version 606 of the application. For example, a compiler can generate platform-specific executable code based on a platform-independent model.

In contrast to the entities in the lower parts of the designtime version 602, model 604, and runtime version 606 of the application, some entities can directly map across different versions of an application. In some implementations, designtime entities can directly map to runtime entities. Designtime entities can directly map to runtime entities by having an associated runtime version. Entities need not directly map on a one to one basis. For example, one designtime entity can directly map to two runtime entities. Designtime entities can directly map to a runtime entity by having an associated runtime version that is precompiled for a platform (e.g., precompiled for a runtime environment, such as Java).

For example, the entity represented by the large triangle 614 in the designtime version 602 of the application can map (e.g., correspond) to an entity in the model 604 of the application, as represented by a large triangle 618 of the same size, shape, placement, and orientation as the large triangle 614 of the designtime version 602 of the application. The model version of the entity represented by the large triangle 618 in the model 604 of the application can map to a runtime entity represented by a large triangle 624 in the runtime version 606 of the application. Consequently, the designtime entity represented by the large triangle 614 in the designtime version 602 of the application can directly map to the runtime entity represented by the large triangle 624 of the runtime version 606 of the application. For example, a selection of a designtime entity in a visual modeling program can have a mapping to one or more runtime entities.

For runtime entities that are directly mapped from designtime entities, the runtime entities can be generated by setting (e.g., configuring) properties of runtime entities based on the properties configured for designtime entities from which the runtime entities were mapped. For example, a configuration of a search form designtime entity can be transposed to a configuration of a precompiled search form runtime entity. Generating runtime entities can further include generating a copy of a runtime entity for each instance of an associated designtime entity of an application. Each runtime entity can be configured to a respective configuration of a respective designtime entity.

Advantageously, by having a direct mapping of designtime entities to runtime entities, a complexity of mapping algorithms in a visual language modeling environment can be reduced. For example, a designtime entity need not be mapped to a model version of an entity before being mapped to a runtime entity. As another example, special generators need not be used to generate a runtime entity, which can reduce an amount of generators that need be coded for a visual modeling language environment and can reduce an amount of time required to generate runtime entities, as entities need not be generated through a special generator (e.g., runtime entities can be precompiled).

In some implementations, there can be a one to one relationship between a designtime entity and a runtime entity to which the designtime entity is mapped. This can further simplify generating runtime entities by reducing reliance on case-dependent mapping schemas (e.g., a mapping schema for each designtime entity). In some implementations, all designtime entities can directly map to runtime entities. In some implementations, designtime entities can directly map to runtime entities intended for different platforms. For example, a first designtime entity can directly map to four different, precompiled runtime entities, where each runtime entity is chosen by a visual modeling program based on a user selection of a platform for an application.

Figure 7:
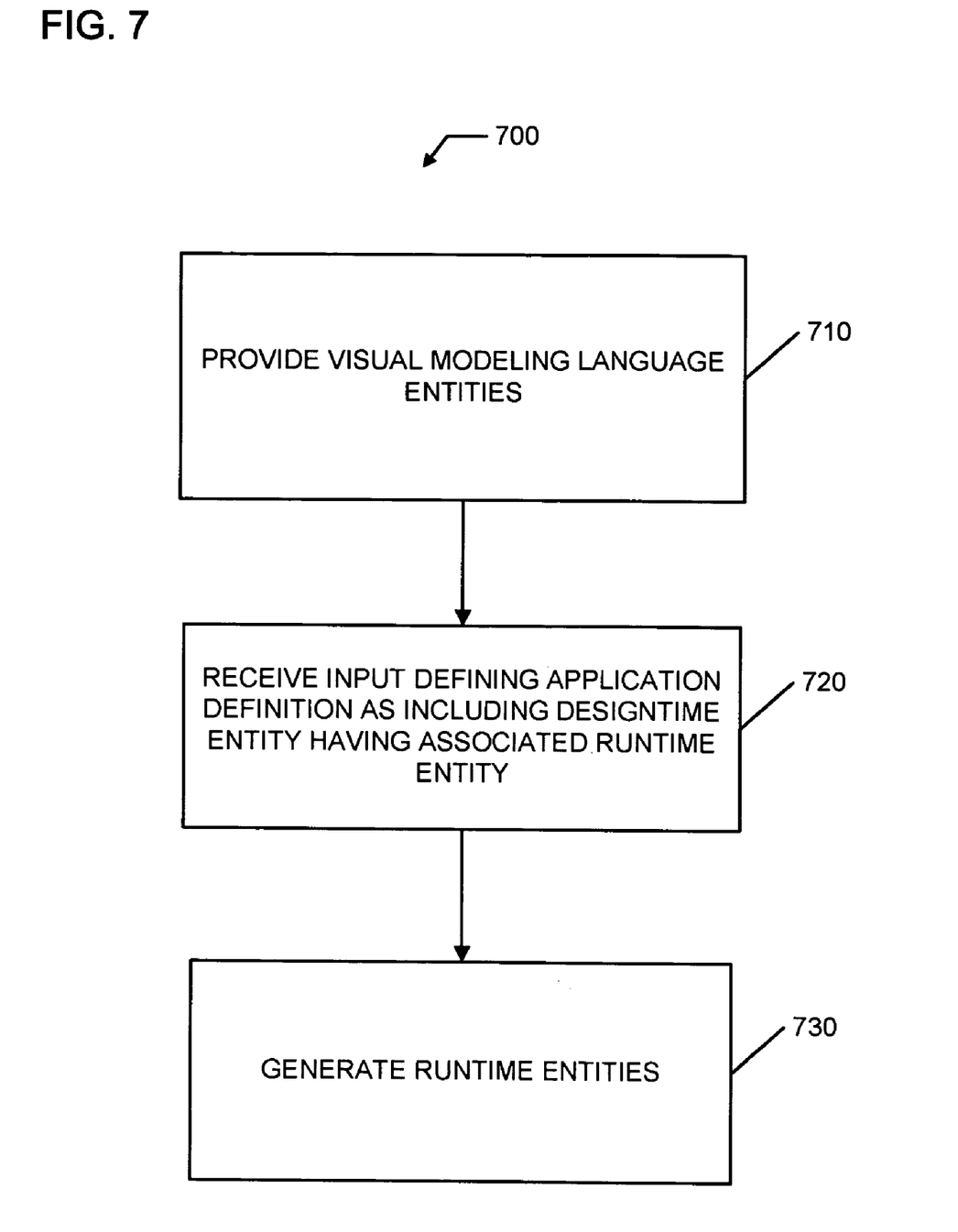
FIG. 7 is a flowchart illustrating generation of an application that includes a precompiled runtime entity mapped from an associated designtime entity.

FIG. 7 is a flowchart 700 illustrating generation of an application that includes a precompiled runtime entity mapped from an associated designtime entity. The runtime entity is precompiled for a specific platform (e.g., a specific runtime system, such as Java, or a specific server environment).

Visual modeling languages entities are provided (710). Visual modeling language entities can be provided with a visual modeling program. The visual modeling language entities that are provided include designtime graphical modeling language entities and runtime entities. At least one of the designtime entities has an associated runtime entity. That designtime entity can be directly mapped to the associated runtime entity. For example, there can be a one to one relationship between the designtime entity and the runtime entity, and the runtime entity can be a precompiled version of the designtime entity. The relationship can be understood to exist by a visual modeling program such that when runtime entities are generated for an application, all copies of the designtime entity in the application have copies of the associated runtime entity.

In some implementations, all of the designtime entities can have associated runtime entities. In some implementations, there need not be a one to one relationship between designtime entities and runtime entities. For example, a single designtime entity can directly map to three corresponding runtime entities. Those entities can be precompiled for a single platform or can be different runtime versions that are precompiled for different platforms. For example, multiple runtime entities can have the same or similar syntax and semantics as a single corresponding designtime entity. As another example, a single designtime entity can be associated with a single runtime entity for one platform and a single runtime entity for another platform.

Input defining an application definition at designtime is received (720). The input defines the application as including a designtime entity having an associated runtime entity as a component of the application. Also, the input defines a configuration of properties of the designtime entity. The input can be received from a user. For example, a user can drag-and-drop a designtime entity in a visual modeling program into an application definition, and configure properties of the designtime entity. By virtue of dragging and dropping the entity the visual modeling program can interpret the application to be defined to include the entity.

Runtime entities based on the application definition are generated (730). This can be performed in response to a user request to generate the application, can be performed automatically in response to the configuration of designtime entities, or in response to any kind of stimulus. Generating the runtime entities includes configuring properties of the runtime entity that is associated with a designtime entity that was defined as being in the application. For example, if a user selects a configuration of a search form designtime entity in a visual modeling program, generating a runtime entity can include configuring the associated runtime entity according to the configuration selected by the user for the associated designtime entity.

Figure 8:
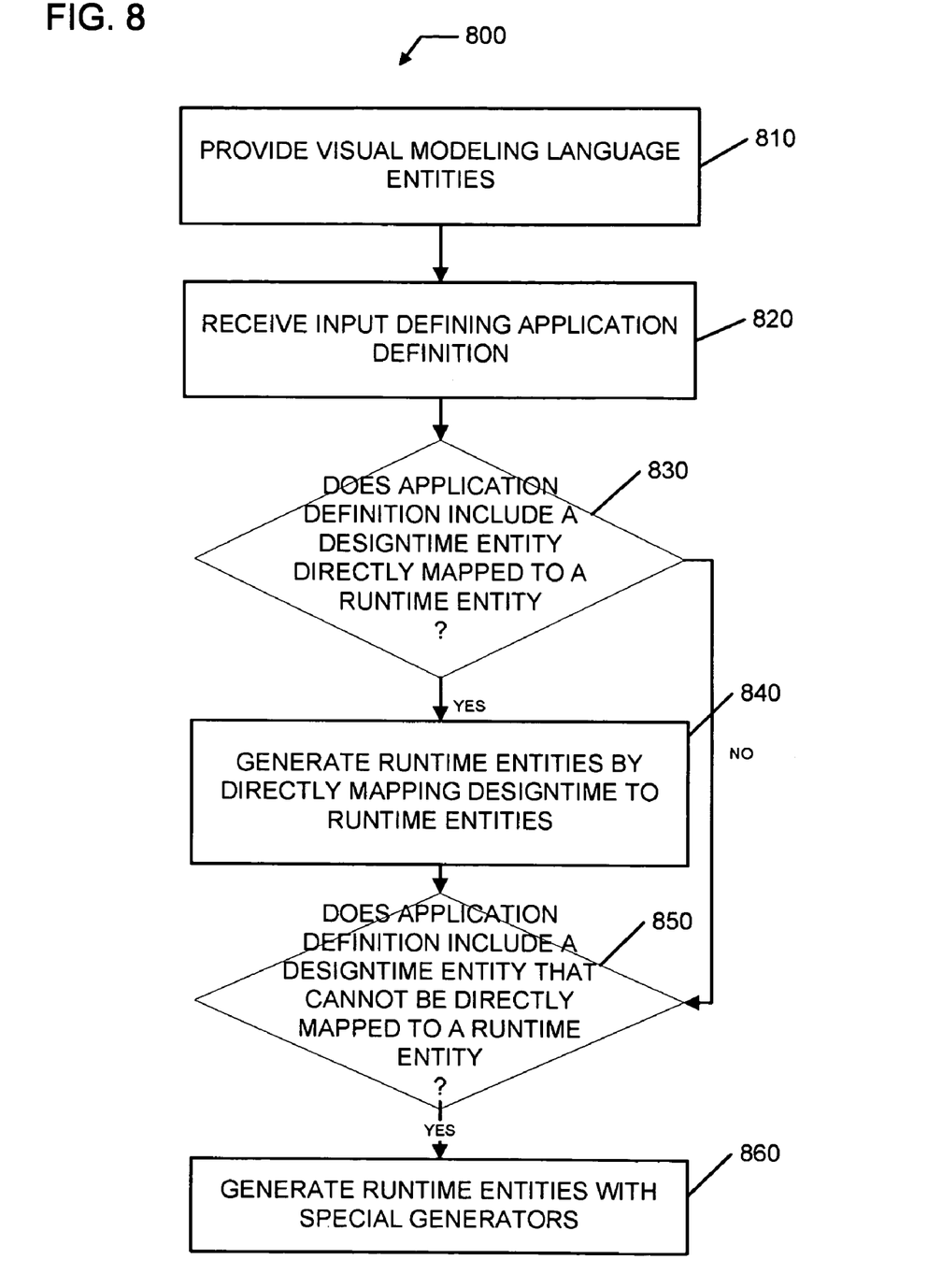
FIG. 8 is a flowchart illustrating generation of an application that can include a precompiled runtime entity mapped from an associated designtime entity.

FIG. 8 is a flowchart 800 illustrating generation of an application that can include a precompiled runtime entity mapped from an associated designtime entity. The flowchart 800 includes features similar to the features of the flowchart 700 in FIG. 7. For example, both flowcharts 700, 800 include a feature of providing visual modeling language entities. In implementations, the similar features can vary.

In general, the flowchart 800 can be used to describe implementations in which runtime entities are generated based on an application definition in designtime that includes designtime entities that can be directly mapped to runtime entities, includes designtime entities that are not directly mapped to runtime entities, or a combination of runtime entities that can be and are not directly mapped to runtime entities.

Once visual modeling languages entities are provided (810) and input defining a definition is received (820), a determination can be made as to whether an application definition includes a designtime entity that can be directly mapped to a runtime entity (830). If the entities can be directly mapped, runtime entities are generated by directly mapping designtime entities to runtime entities (840), for those entities which can be directly mapped. Generating a runtime entity directly mapped from a designtime entity can include generating a copy of a default version of runtime entity associated with the designtime entity and setting properties of the copy of the runtime entity to reflect a configuration of properties of the designtime entity. The default version of the runtime entity can be precompiled for a computing platform (e.g., a runtime system, such as Java). As the runtime entity can be directly mapped from the designtime entity by setting properties of the runtime entity in accordance with the associated designtime entity's properties and the runtime entity can be precompiled, the runtime entities can be quickly and efficiently generated. As examples, a model of a designtime entity need not be used to generate the runtime entity, complex mapping between designtime entities and runtime entities need not be used, and special generators need not be used to compile runtime entities based on a designtime entity. Directly mapping designtime to runtime entities can include having a one to one correspondence between properties in a designtime entity with the corresponding properties in an associated runtime entity (e.g., a property "length" in a designtime entity can correspond to a property "length" in an associated runtime entity). A one to one correspondence of properties can exist in combination with a one to many mapping of a designtime entity to runtime entities (e.g., properties "length" and "color" in a designtime entity can be directly mapped to a property "length" of a first runtime entity and a property "color" of a second runtime entity).

If no designtime entities can be directly mapped, or designtime entities that can be directly mapped have been directly mapped, a determination is made as to whether an application definition includes designtime entities that cannot be directly mapped to runtime entities (850). If there are designtime entities that cannot be directly mapped to runtime entities (e.g., a designtime entity has no associated, precompiled runtime entity to which properties can be mapped), runtime entities based on those designtime entities are generated with special generators (860). Generating runtime entities with special generators can include having a particular runtime entity generator for each designtime entity, which uses special algorithms to generate a model of the designtime entities (e.g., as part of a model 604 version of an application) and then computes a runtime entity based on the model of the designtime entities (e.g., compiles code that includes Java objects of the model).

The subject matter described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including method steps, can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter of this specification can be implemented in a computing system that includes a back-end component (e.g., a data server), a middleware component (e.g., an application server), or a front-end component (e.g., a client computer having a graphical user interface or a web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, the operations of 830 and 840 in FIG. 8 can be switched with the operations of 850 and 860, and the flowchart 800 of FIG. 8 can still achieve desirable results. In certain implementations, multitasking and parallel processing may be preferable. Other embodiments are within the scope of the following claims.

What is claimed is:

1. A computer-implemented method comprising:
   selecting, on at least one computer, a plurality of patterns in a visual modeling environment and establishing connections between the plurality of patterns to create a design time graphical representation of a user interface of an end-user application, wherein each pattern performs one or more user interface tasks and different patterns performing different user interface tasks have different graphical representations, and wherein at least one pattern comprises a plurality of nested patterns;
   configuring the plurality of patterns to specify application specific properties of each pattern to produce configuration data, the configuration data defining the behavior of the one or more user interfaces tasks in the end-user application, wherein each pattern, before configuration, comprises first properties, and wherein each pattern, after configuration, comprises second properties in addition to the first properties, wherein the second properties are specific to the end-user application, wherein the first properties include a location of one or more user interface elements in said user interface, and wherein the second properties include specific properties of the user interface elements when the one or more user interface elements are rendered in said user interface;
   storing the configuration data in a repository;
   generating a model of the end-user application using the configuration data, the model of the end-user application comprising a plurality of components, wherein at least one component comprises a plurality of nested components, wherein the model is a platform independent representation of the patterns of the end-user application; and
   translating the components of the model into a plurality of runtime entities to execute the end-user application, wherein said translating comprises generating platform specific executable code based on the platform-independent model.

2. The method of claim 1 wherein one or more components of the model comprise:
   a programming interface, wherein a higher level component interacts with one or more nested components using the programming interface.

3. The method of claim 1 wherein one or more components of the model comprise:
   a data binding interface, wherein a higher level component exchanges data with one or more nested components using the data binding interface.

4. The method of claim 1 wherein one or more components of the model comprise:
   a visual interface, wherein a higher level component accesses the visual representation of one or more nested components using the visual interface.

5. The method of claim 1 wherein each component of the plurality of components of the model is associated with a particular pattern in said plurality of patterns in the visual modeling environment.

6. The method of claim 1 wherein said translating comprises configuring a runtime entity based on configuration data for a pattern.

7. The method of claim 1 further comprising precompiling a plurality of runtime entities and mapping a plurality of patterns to corresponding runtime entities.

8. The method of claim 1 wherein the configuration data comprises references to the plurality of patterns.

9. The method of claim 1 wherein the unconfigured patterns are reusable in different end-user applications and the configured patterns are reusable in different end-user applications.

10. The method of claim 1 wherein the plurality of patterns in the visual modeling environment further comprises:
    syntax rules governing how the patterns can be composed; and
    semantic rules governing how the patterns will be interpreted to generate the runtime version of the end-user application.

11. A computer program product, tangibly embodied in a machine-readable storage device, the computer program product operable to cause a data processing apparatus to:
    select, on at least one computer, a plurality of patterns in a visual modeling environment and establishing connections between the plurality of patterns to create a design time graphical representation of a user interface of an end-user application, wherein each pattern performs one or more user interface tasks and different patterns performing different user interface tasks have different graphical representations, and wherein at least one pattern comprises a plurality of nested patterns;
    configure the plurality of patterns to specify application specific properties of each pattern to produce configuration data, the configuration data defining the behavior of the one or more user interfaces tasks in the end-user application, wherein each pattern, before configuration, comprises first properties, and wherein each pattern, after configuration, comprises second properties in addition to the first properties, wherein the second properties are specific to the end-user application, wherein the first properties include a location of one or more user interface elements in said user interface, and wherein the second properties include specific properties of the user interface elements when the one or more user interface elements are rendered in said user interface;
    store the configuration data in a repository;
    generate a model of the end-user application using the configuration data, the model of the end-user application comprising a plurality of components, wherein at least one component comprises a plurality of nested components, wherein the model is a platform independent representation of the patterns of the end-user application; and translate the components of the model into a plurality of runtime entities to execute the end-user application, wherein said translating comprises generating platform specific executable code based on the platform-independent model.

12. The computer program product of claim 11 wherein each component of the plurality of components of the model is associated with a particular pattern in said plurality of patterns in the visual modeling environment.

13. The computer program product of claim 11 further comprising precompiling a plurality of runtime entities and mapping a plurality of patterns to corresponding runtime entities.

14. The computer program product of claim 11 wherein the unconfigured patterns are reusable in different end-user applications and the configured patterns are reusable in different end-user applications.

15. The computer program product of claim 11 wherein the plurality of patterns in the visual modeling environment further comprises:

syntax rules governing how the patterns can be composed; and semantic rules governing how the patterns will be interpreted to generate the runtime version of the end-user application.

16. A system comprising:

at least one processor;

at least one memory; and a computer program executable to perform a method comprising:

selecting, on at least one computer, a plurality of patterns in a visual modeling environment and establishing connections between the plurality of patterns to create a design time graphical representation of a user interface of an end-user application, wherein each pattern performs one or more user interface tasks and different patterns performing different user interface tasks have different graphical representations, and wherein at least one pattern comprises a plurality of nested patterns;

configuring the plurality of patterns to specify application specific properties of each pattern to produce configuration data, the configuration data defining the behavior of the one or more user interfaces tasks in the end-user application, wherein each pattern, before configuration, comprises first properties, and wherein each pattern, after configuration, comprises second properties in addition to the first properties, wherein the second properties are specific to the end-user application, wherein the first properties include a location of one or more user interface elements in said user interface, and wherein the second properties include specific properties of the user interface elements when the one or more user interface elements are rendered in said user interface;

storing the configuration data in a repository;

generating a model of the end-user application using the configuration data, the model of the end-user application comprising a plurality of components, wherein at least one component comprises a plurality of nested components, wherein the model is a platform independent representation of the patterns of the end-user application; and translating the components of the model into a plurality of runtime entities to execute the end-user application, wherein said translating comprises generating platform specific executable code based on the platform-independent model.

17. The computer program product of claim 16 wherein each component of the plurality of components of the model is associated with a particular pattern in said plurality of patterns in the visual modeling environment.

18. The computer program product of claim 16 further comprising precompiling a plurality of runtime entities and mapping a plurality of patterns to corresponding runtime entities.

19. The computer program product of claim 16 wherein the unconfigured patterns are reusable in different end-user applications and the configured patterns are reusable in different end-user applications.

20. The computer program product of claim 16 wherein the plurality of patterns in the visual modeling environment further comprises:

syntax rules governing how the patterns can be composed; and semantic rules governing how the patterns will be interpreted to generate the runtime version of the end-user application.

* * * * *